United States Patent [19]

Michelsen

[11] 3,953,132
[45] Apr. 27, 1976

[54] SYSTEM FOR REGISTERING POSITION OF ELEMENT
[75] Inventor: Paul F. Michelsen, Kensington, Md.
[73] Assignee: RMC Research Corporation, Bethesda, Md.
[22] Filed: Mar. 22, 1974
[21] Appl. No.: 453,974

Related U.S. Application Data
[62] Division of Ser. No. 268,632, July 3, 1972, Pat. No. 3,798,795.

[52] U.S. Cl. .............................. 356/152; 89/41 L; 250/231 SE; 356/141
[51] Int. Cl.² ........................................ G01B 11/26
[58] Field of Search ........................... 356/141, 152; 250/231 SE; 33/281, 282, 1 T; 35/25; 81/41 L, 41 TV

[56] References Cited
UNITED STATES PATENTS
3,536,406  10/1970  Granqvist ............................ 356/152
3,557,458  1/1971   Shults ................................... 33/1 T
3,766,826  10/1973  Salomonsson ........................ 89/41 L Primary Examiner—T. H. Tubbesing
Assistant Examiner—S. C. Buczinski
Attorney, Agent, or Firm—Revere B. Gurley

[57] ABSTRACT

The movement of a weapon, such as a gun, about a horizontal axis and a vertical axis is measured to provide the direction of the line of aim at any instant. The elevation angle above a horizontal base is measured by a pulse counting mechanism in which the number of pulses counted is proportional to the angle. The azimuth is measured by pulse counting mechanism initiated and stopped by lights and rotating mirrors on the gun mount and at a fixed point along a base line.

8 Claims, 14 Drawing Figures

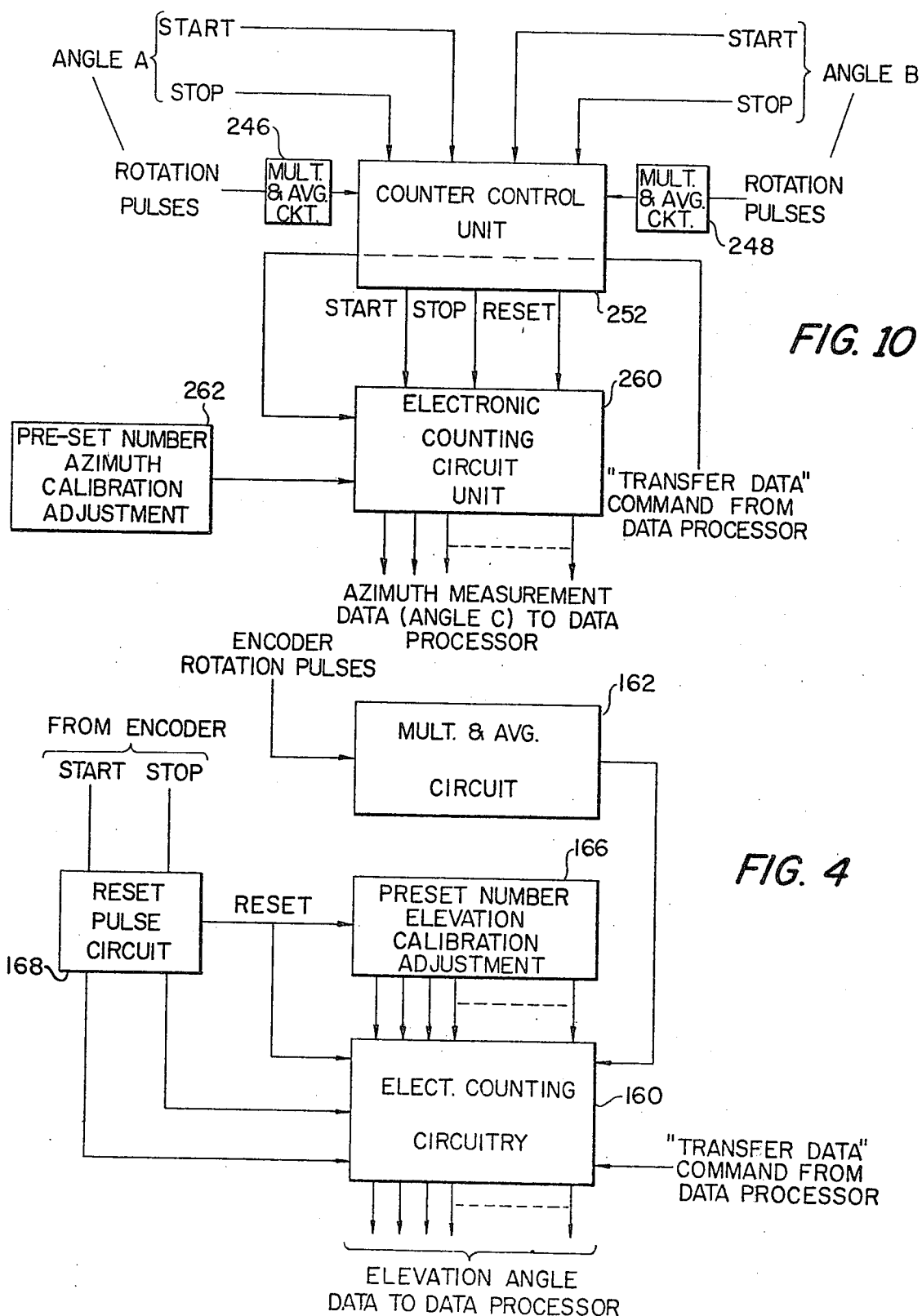

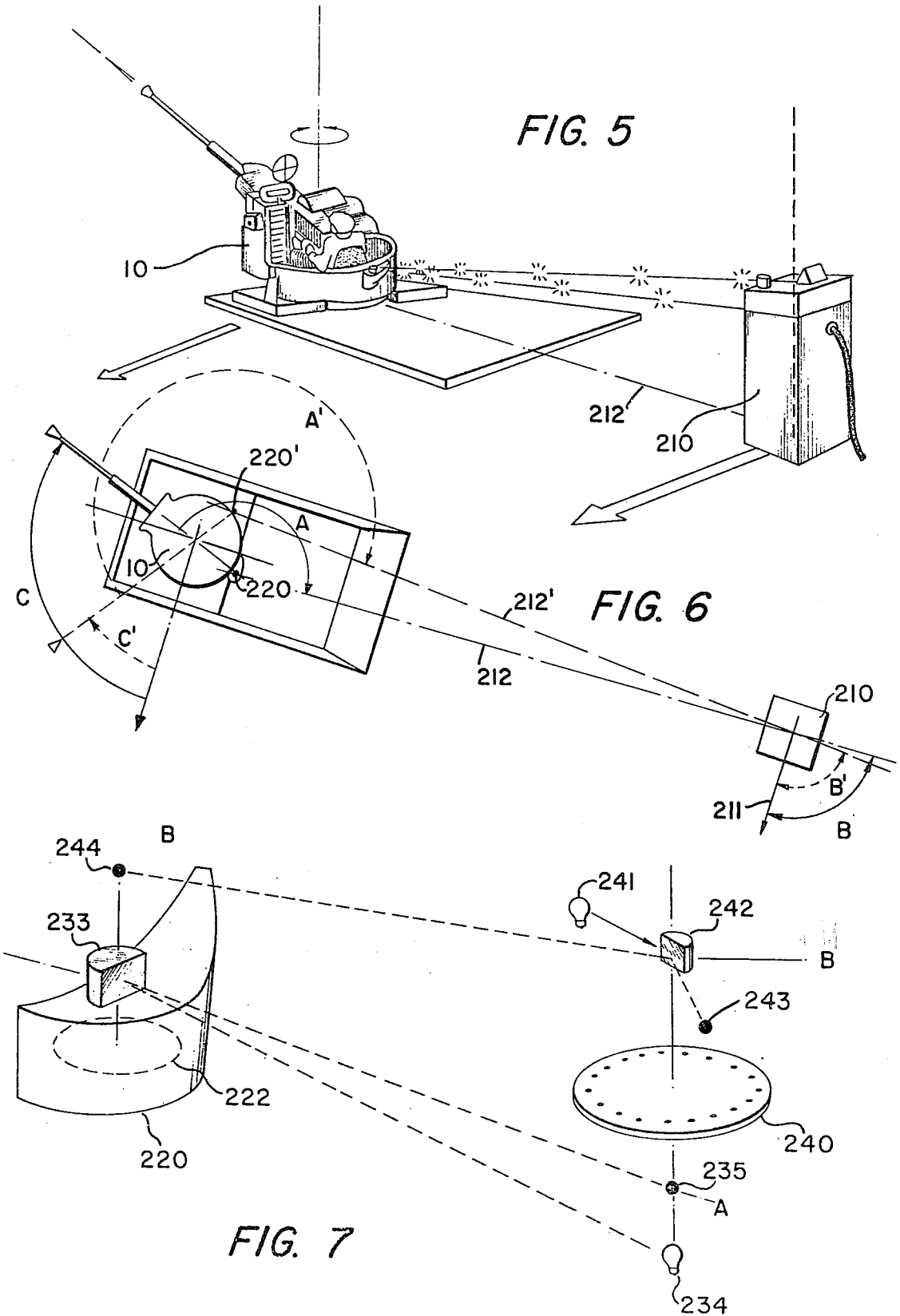

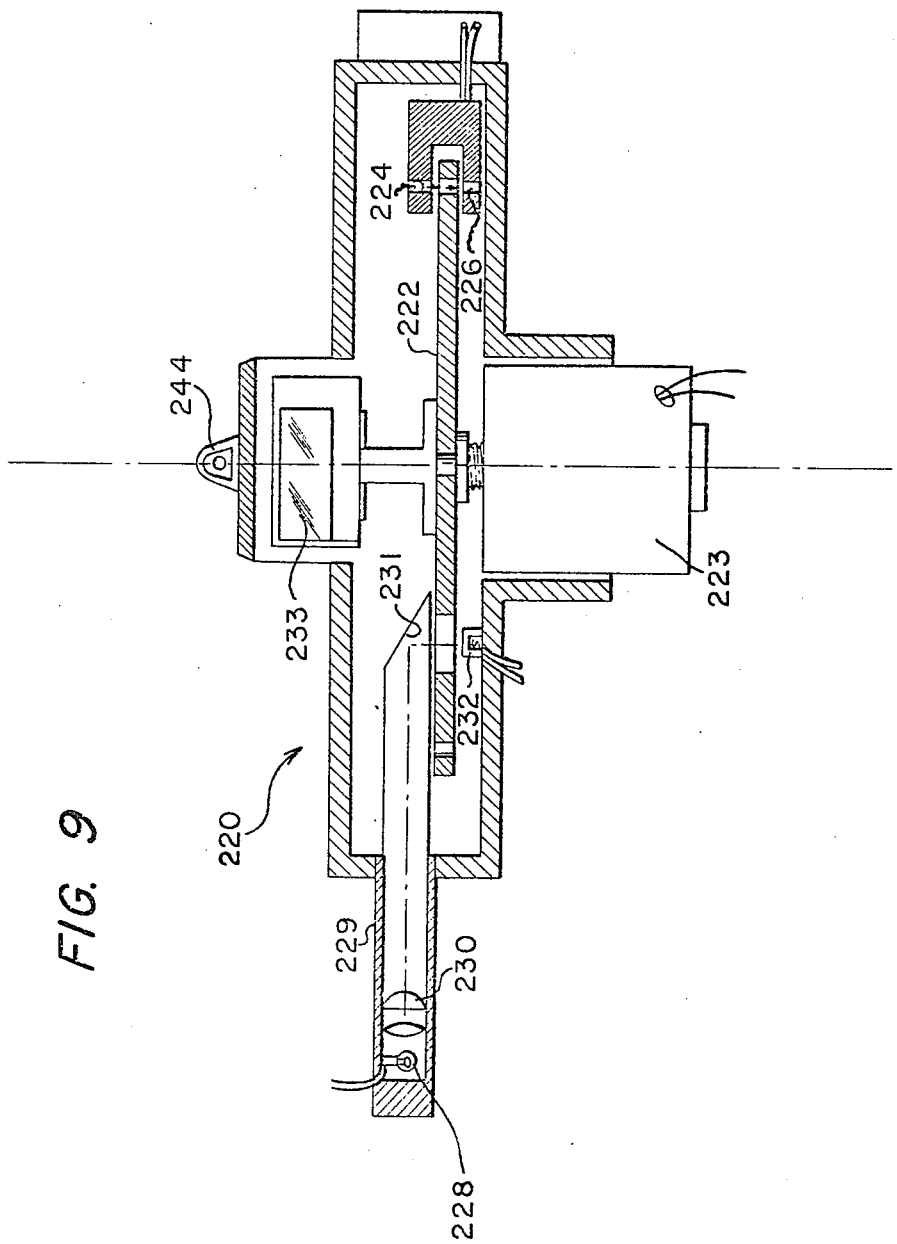

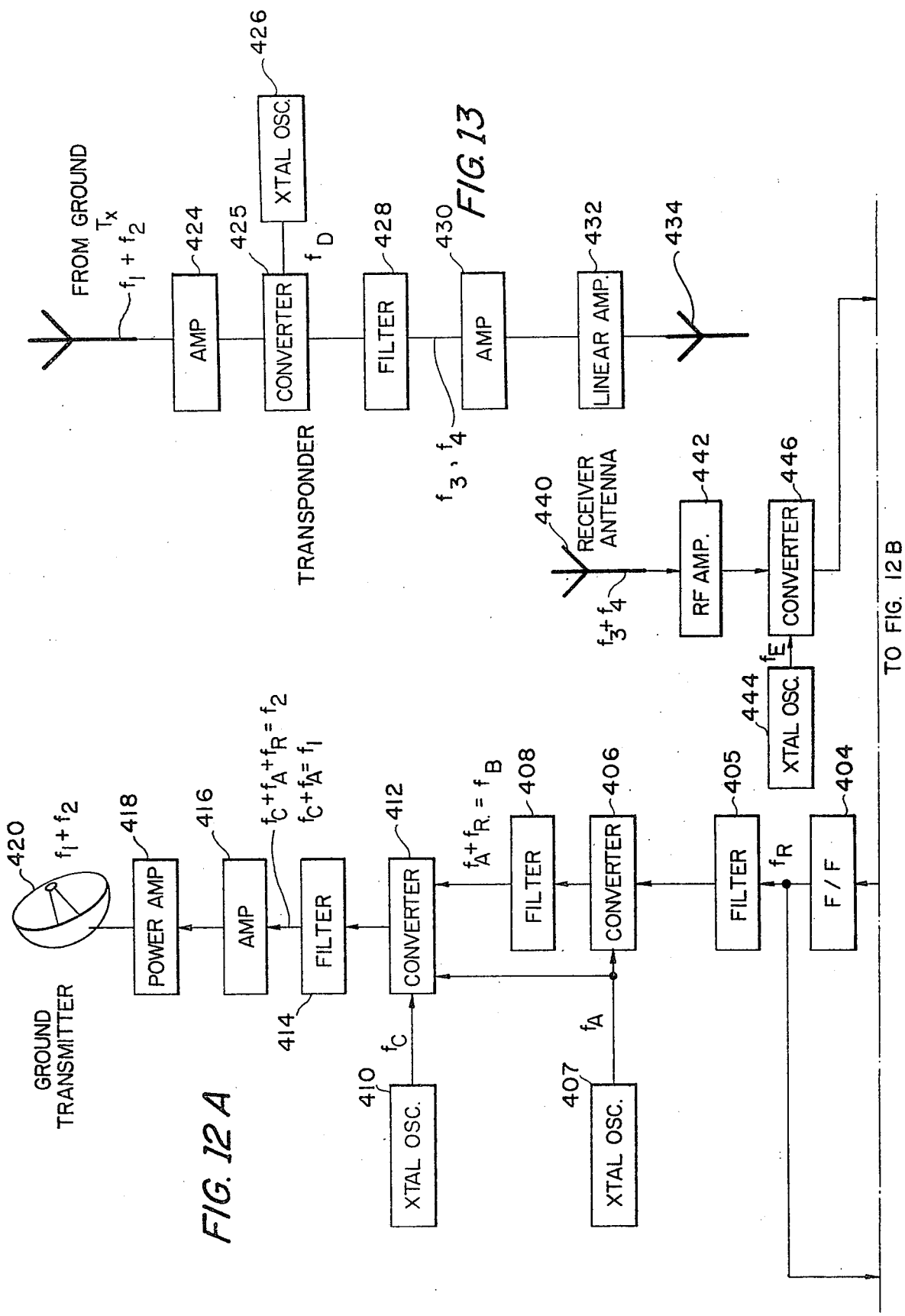

SYSTEM FOR REGISTERING POSITION OF ELEMENT

This application is a division of Ser. No. 268,632, filed July 3, 1972, to be patented Mar. 26, 1974, as U.S. Pat. No. 3,798,795.

This invention relates to a system for registering the position of an element movable about orthogonal axes, as a gun which is positioned relative to vertical and horizontal axes, the angles being measured as azimuth and elevation.

The entire Weapon Aim Evaluation System includes a weapon such as a gun designed to be aimed at a target, and a target such as an airplane carrying a light and a radio transmitter which is actuated by a radio receiver. In the System for Registering Position of Element, angle measuring mechanisms measure the elevation and azimuth of the gun, and the Object Locating System gives the position of the target. A data processing unit receives and registers the data from the system and computes the results.

The System for Registering Position of Element of this invention consists of a pulse counting mechanism used to measure the elevation angle of the gun and also pulse counting mechanisms for measuring angles about a vertical axis from which can be calculated the azimuth. In measuring azimuth, a unit carried by the gun mount rotates with the gun about a vertical axis and carries a counting pulse mechanism which measures the angle of the gun with a line through the unit and a fixed point. Another pulse counting mechanism measures the angle the line makes at any instant with a fixed base line, so that the angle of the gun may be calculated relative to the fixed base line.

The essential components of the system and their operation are:

1. THE WEAPON SYSTEM WITH ANGLE MEASUREMENT.

The weapon itself, in the case illustrated an anti-aircraft gun which has associated with it components for its line-of-aim measurement, in this case elevation angle measurement and azimuth angle measurement systems. The azimuth angle measurement system includes a Ground Point Location element so that the azimuth angle is measured in a coordinate system oriented to the gun and yet is independent of changes in the gun position. The data from these systems is supplied to the Data Processing Unit.

The object of the system used for elevation angle measurement is to measure the angular position relative to a zero position of an angularly movable member at frequent small time intervals and to register such angular measurement at any particular time.

The object of the system used for azimuth angle measurement is to measure the angular position of an angularly movable member relative to a fixed line or base line at frequent small time intervals, and to register such angular measurement at any particular time. This measurement is carried out with reference to a point external to the motion system of the movable member.

The elevation angle measurement and azimuth angle measurement systems are complete angle measuring systems in themselves and have general utility in measuring angular position. In both systems, electrical pulses are produced by a rapidly spinning body and input to a counter. The counting of pulses is controlled by the relative angular position of the gun to its mount in the elevation angle measurement and relative to a ground point position spaced from the gun in the azimuth angle measurement.

2. THE TELEVISION CAMERA DIRECTION SYSTEM.

A television camera which follows the target provides for line-of-sight measurement of the target, by an elevation angle measurement and an azimuth angle measurement. The television camera has an electronic system which cooperates with a signal unit, a light on the target, and provides an accurate measurement of the line-of-sight for data to be supplied to the DPU to be utilized in calculating the target position.

The object of the television camera direction system is to register the direction of an object which produces an image on the sensitive surface of the camera. The source of the image is a light, and the coordinates of the image on the surface with the directional angles of the camera tube are combined to provide an accurate measurement of the angles of the line-of-sight to the light.

3. THE DISTANCE MEASUREMENT SYSTEM.

The distance or range measurement system, which measures the distance of the target constantly, and provides this data to the DPU. This system includes the transmitter, a transponder on the aircraft for transmitting a return signal, a receiver to receive the return signal, and phase measuring circuits to derive distance data for the DPU. The ground unit, or the transmitter, is mounted to move with the television camera, so that the unit or its transmitter is directed toward the target. These two devices may be mounted on the same base for conjoint movement.

The object of this system is to measure a distant object by high frequency radiations without ambiguity inherent in direct measurement by high frequency radiations. This system employs radiations spaced by a low frequency with a wave length comparable to the range of the system, utilizing the phase displacement of the low frequency to provide the measurement.

THE DRAWINGS

FIG. 4 is a schematic of the electronic circuit of the elevation angle measurement system, which is connected to the apparatus of FIGS. 2 and 3.

FIG. 5 is a diagrammatic view of the azimuth measurement system for the gun.

FIG. 6 is a diagram illustrating how the angles are measured by the system of FIG. 5.

FIG. 7 is a diagrammatic view showing the operation of the system of FIG. 5.

FIG. 9 is a vertical axial section of the unit of FIG. 8.

FIG. 10 shows the electronic circuitry for providing data of the value of the azimuth angle, from the system of FIGS. 5 to 9.

FIGS. 12A and 12B are a composite block diagram of the ground radio apparatus.

FIG. 13 is a block diagram of the radio apparatus on the target.

SYSTEM OPERATION

Figure 1:
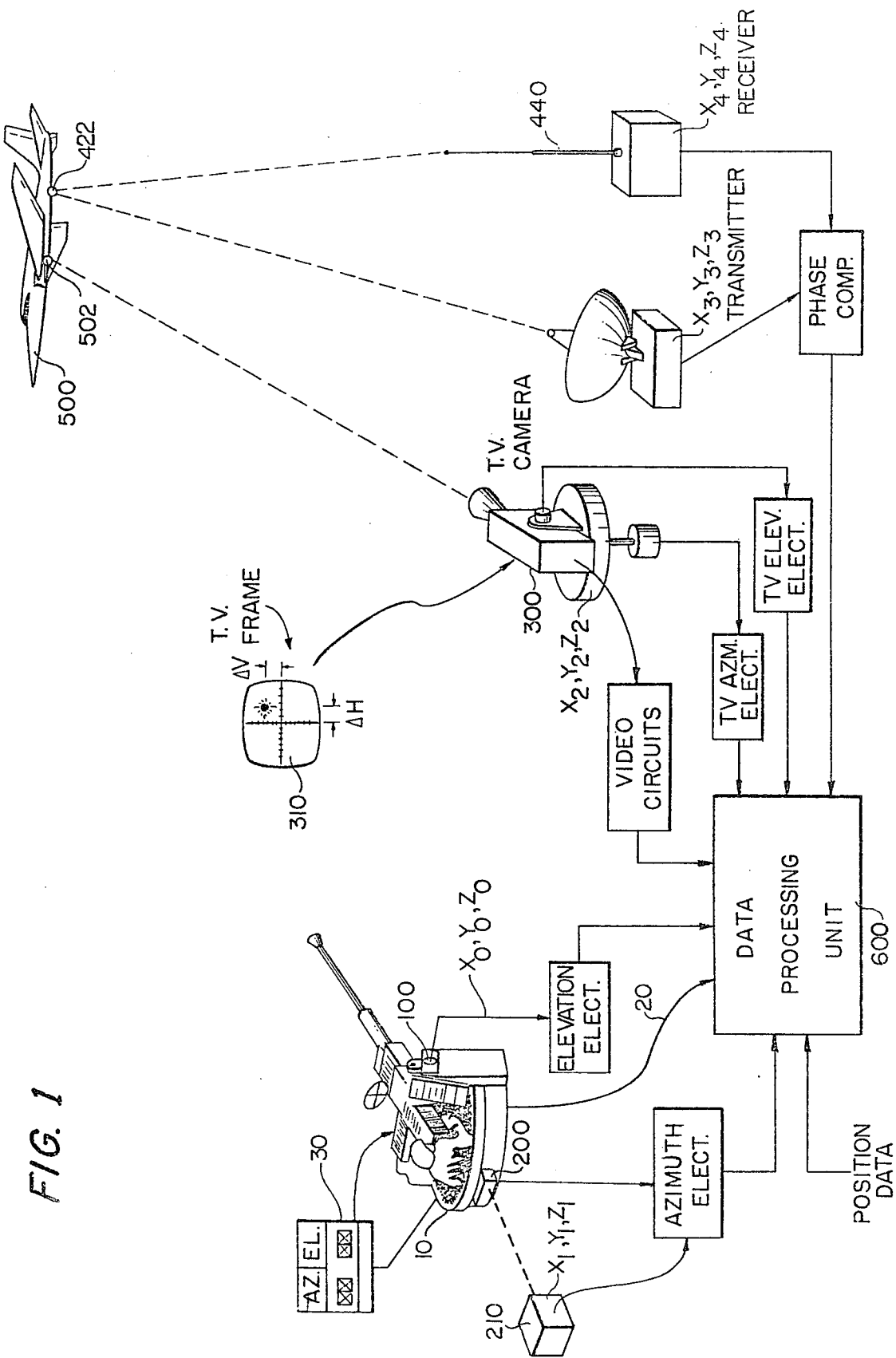
FIG. 1 is a diagrammatic view of the entire system.
Figure 2:
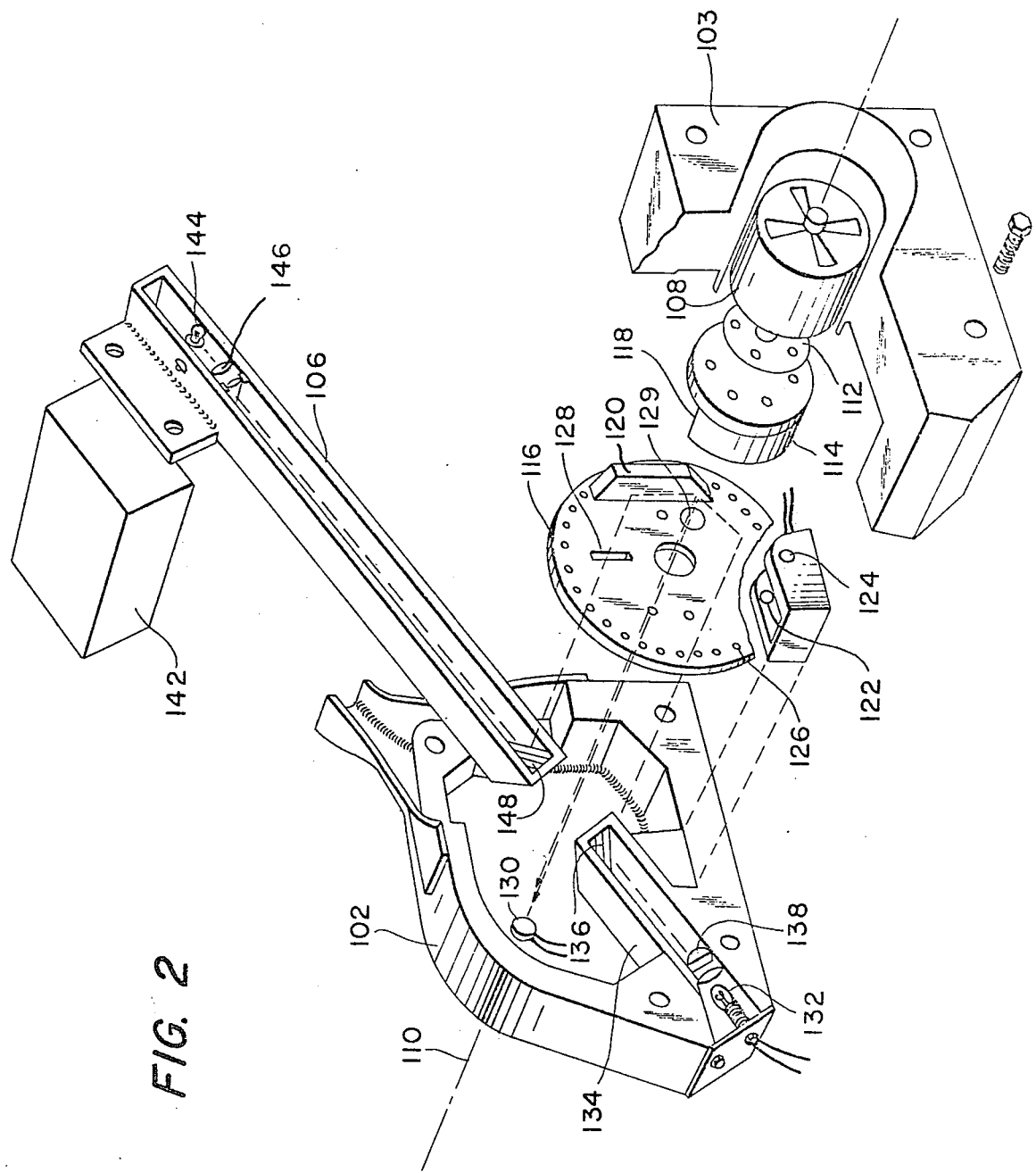
FIG. 2 is an exploded view of the elevation angle measurement apparatus, which is mounted on the gun.
Figure 3:
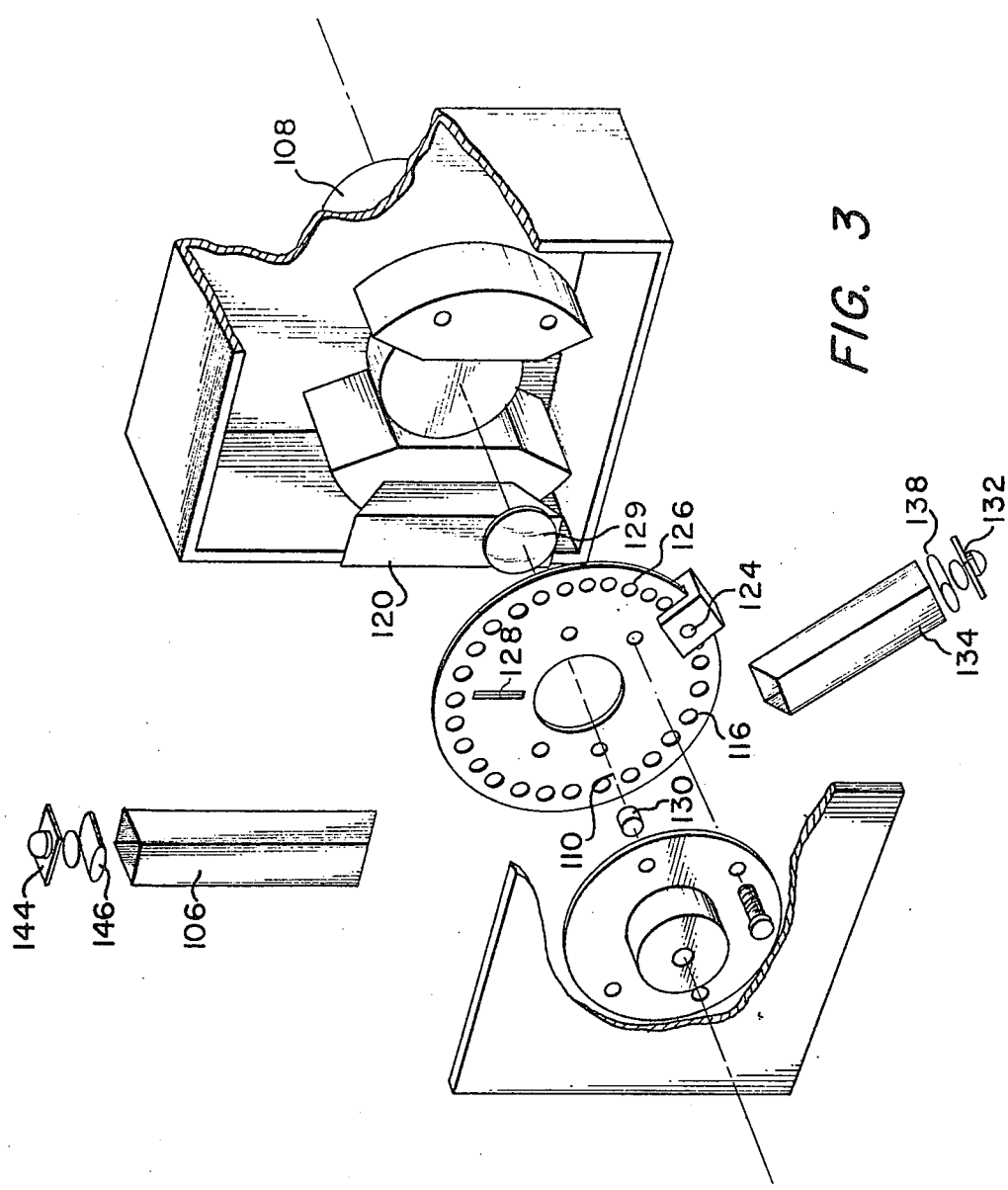
FIG. 3 is another exploded view showing the apparatus of FIG. 2.

The missile-firing weapon, or anti-aircraft gun 10, is placed at a point $x_0$, $y_0$, $z_0$ in a common coordinate system. The elevation angle measurement 100 provides the data of the elevation angle of the gun as it is moved by the gunner, and the azimuth angle measurement system 200 provides the data for the azimuth angle. A ground point location unit 210 at a point $x_1$, $y_1$, $z_1$ in the common coordinate system is used as a reference position for measurement system 200 of the azimuth angle. The elevation and angle measurement systems transmit pulses which represent the values of the angles to electronic averaging and multiplier units.

The TV camera 300 at position $x_2$, $y_2$, $z_2$ in the common coordinate system may be manually moved to follow the target or could be moved automatically. In addition to devices for measurement of the elevation and azimuth angles of its line-of-sight, the camera is provided with an electronic scanning measuring system for registering the position of a signal light 502 carried by the aircraft target 500. The elevation and azimuth angle measuring systems and the electronic video signal measuring system transmit data of the values of these measurements to the Data Processing Unit (DPU) 600. With the data from these systems, the DPU can make an accurate calculation of the position of the target.

The range or distance measurement system 400, with the ground unit transmitter at $x_3$, $y_3$, $z_3$, also includes the transponder 422 on the aircraft target 500, which relays the return signals to the ground receiver at $x_4$, $y_4$, $z_4$. This system, transmitting in high radio frequencies, uses a narrow band and measures the distance unambiguously with standard circuitry to the necessary accuracy for this purpose.

Operation of the firing mechanism of weapon 10 activates the DPU through lead 20 initiating the calculations from the data input of the weapon, TV camera, and range measurement systems. The DPU calculates the path of a conventional projectile and compares it to the flight of the target aircraft either as actually flown by the target or as predicted by, for example, a least squares curve fitting calculation. The DPU may then exhibit at 30 the score of hit or miss as well as the errors in elevation and azimuth angles.

ELEVATION ANGLE MEASUREMENT

The apparatus for measuring the angle of elevation of the gun comprises a casing 102, 103 on the gun supporting structure and an arm 106 fixed to and angularly movable with the gun. The casing, formed in two parts, 102 and 103, encloses a motor 108, having its axis aligned with the axis 110 of the trunnions of the gun but not mechanically connected so that its shaft revolves about the same axis. A plate 112 on the shaft of the motor carries a supporting member 114, which is fastened to the rotating disk 116. The supporting member 114 is formed with a pocket or is cut away at 118 to receive a light displacing and reflecting element in a casing 120 fixed to a disk 116.

The disk 116 operates to produce electrical pulses by a light 122 and photocell 124 mounted adjacent its periphery, the disk being formed with apertures 126 or light deflecting elements about its periphery. The photocell is energized at regular intervals as the disk rotates, thereby producing electrical pulses from the photocell 124.

The disk 116 is also formed with a narrow, radial slit or aperture 128, opposite the casing 120. This casing carries mirrors to deflect light passing through the aperture 128 and a lens 129 aligned with the axis of rotation 110, to direct the light on to a photocell 130 positioned on the axis.

The casing carries a light source 132 in a light casing 134 provided with a mirror 136 to reflect the light on to the disk 116 and through the aperture 128 as it passes the casing. The casing may carry a lens system 138 which may include a cylindrical lens to form a narrow beam of light.

Arm 106 is formed as a second, elongated light casing secured to the gun, as through an adapter 142, to move with the gun, and projects into the casing 102. This casing 106 carries a light 144 at its outer end, the light from which passes through a lens system 146 which, like lens system 138, has a cylindrical lens.

The other end of casing 106 extending into casing 102 carries a mirror 148 opposite the path of the aperture 128. The casing 102 may be provided with a flexible closure where the light casing 106 passes into it to avoid light from outside the casing 102, 103.

The disk is driven rapidly by motor 108 and produces rapid, successive pulses from light 122 and photocell 124, which are connected to the electronic multiplier and averaging circuit 150 (FIG. 4).

When aperture 128 in disk 116 rotates past the light beam from fixed light 132, the photocell 130 produces a start pulse which is transmitted to the counting circuit (FIG. 4) to the counter 160 to start registering of the count. This counter 160 receives the pulses produced by the disk 116 and photocell 124 through the multiplier and averaging circuit 162. These pulses are registered successively until the slit in rotating disk 116 reaches the light beam from the angularly movable light 144 and casing 106, producing a pulse from photocell 130 which is transmitted to counter 160 to discontinue the count.

An elevation angle calibration adjustment circuit 166 presets the number in the counter to set the counter for a "zero" horizontal angle. The start and stop pulses pass through a reset pulse circuit 168 which is connected to the calibration adjustment circuit so that the counter will be properly set at the beginning of each count.

AZIMUTH ANGLE MEASUREMENT

The measurement of the position of the angularly movable gun mount about a vertical axis is not easily measured in the same way as the elevation angle, because the weapon shifts its position relative to the ground due to recoil. The system used by applicant provides a ground point location unit 210 spaced from the gun mount (FIG. 5) so that the data of angular position relative to the fixed ground point location may be transmitted to the computer and used to calculate the azimuth angle relative to a fixed base line. This method, illustrated in FIG. 6, involves measuring the angle A of the gun relative to a line 212 between a measuring unit 220 on the angularly movable gun mount and the ground point location unit 210, the angle B between this line 211 and a fixed base line having zero direction, from which the angle C of the gun with respect to the zero base line may be calculated, i.e., $C = 360° - (A+B)$.

Figure 8:
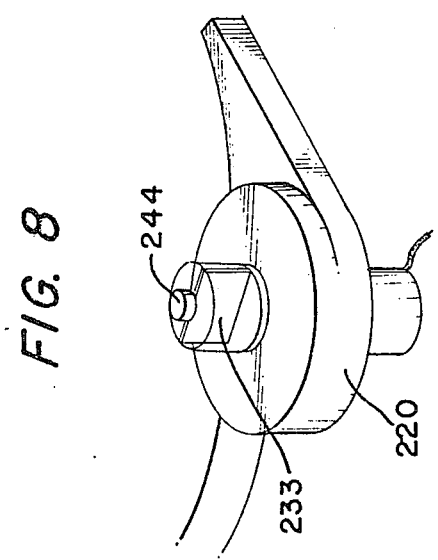
FIG. 8 is a perspective view of the unit on the gun mount which moves with the gun about a vertical angle.

The unit 220 movable with the gun is shown in FIGS. 7 and 8. This unit produces pulses which are used to measure angular position in cooperation with a light and photocell on the ground point location unit 210.

The counting pulses for measuring angle A are produced by a disk 222 having peripheral apertures which are in the path of light from light source 224 to photocell 226. A motor 223 drives disk 222 about a vertical axis. These pulses are fed to a counter circuit under control of start-stop pulses.

A light 228 fixed on the unit 220 in a light tube 229 passes through a lens system 230 having a cylindrical lens to form a narrow beam and is reflected by mirror 231 on to disk 222, passing through an aperture in the disk to energize photocell 232. The energization of this photocell produces a start pulse for the counting circuit.

A mirror 233 mounted on the shaft of the motor above the disk cooperates with a light 234 and photocell 235 on the ground point location unit 210 to produce a stop pulse to the counter circuit. Since the mirror, 233 rotates with the disk 222, the position of the mirror relative to the ground point at the time the photocell is energized will depend on its angle of rotation from the "fixed" or zero position which formed the start pulse, and the count of the pulses will form a measure of the angle A between the gun and the line 212 from gun mount unit 220 to ground unit 210.

As shown in dotted lines in FIG. 6, if the gun rotates with unit 220 on line 212', the angle A' will be measured between the gun direction and the line 212'. The disk 222 at its "start" pulse position is related to a fixed reference position on the gun. As disk 222 and mirror 233 fixed to the disk rotate, the mirror will intercept and reflect light from source 234 back to the detector 235 on ground unit 210. This position of mirror 233 is unique for any position of gun mount unit 220, and produces a "stop" pulse which is a given interval from the start pulse. This interval is measured by the pulses emitted by pulsing mechanism 224, 226 to give the angle A or A' of the gun relative to a line to the ground unit 210.

To measure angle B, the ground point location unit carries a disk 240 to produce counting pulses. The ground unit also employs a light 241, a mirror 242 rotatable with the disk and a photocell 243 which receives light reflected by the mirror to provide a fixed reference position. The unit 220 on the gun mount also carries a photocell 244 axially aligned with the axis of the disk and mirror, which receives light from mirror 242, to provide a stop pulse to the counting circuit, the counting pulses between the start and stop pulses representing the measure of angle B.

The counting circuit shown in FIG. 10 includes a multiplier and averaging circuit 246 for pulses from angle A measuring system and another circuit 248 for pulses from angle B measuring system. The start and stop pulses for angle A measurement are fed into the counter control unit 252 at the left and those for angle B measurement at the right. The control unit 252 under command of the Data Processing Unit may transfer the data from the control unit to the counting unit 260 which is also controlled by the control unit. A calibration adjustment 262 provides for presetting the counting unit to a zero or reference setting.

TELEVISION CAMERA TARGET TRACKER

The television camera is used to track the target and with associated elements and electronics provide a measure of the angular position of the target. The elevation and azimuth angles are used to register the line-of-sight of the camera and the data of these angles and the location of the target within the camera's field-of-view is fed to an electronic unit for the determination of the exact angular position of the target.

In the present system the target aircraft carries a signal light which gives substantially a point image on the TV frame. The TV camera subtends a substantial angle while the image of the target may occupy only a small spot somewhere on the frame of the TV camera. Therefore, the line-of-sight will, in general, give only a coarse and unreliable measure of the angular location of the target. A more accurate measure of the angular location of the target is necessary for accurate evaluation of the gunnery operation. For this purpose, the position of the image is located on the frame in the camera, and this position is related to the direction of the camera axis or line-of-sight. This light may be infrared, to avoid confusion of the gunner, and can be obtained by filtering broad band light to shut out visible light. The position of the point light on the TV frame is measured by the scanning trace of the TV camera, and the data from the trace is then inputted to the electronic unit to modify the camera direction data and give the true line-of-sight of the target.

The television camera 300 is mounted for movement in all directions, i.e., the elevation angle and azimuth angle, being measured by angle measuring apparatus similar to the elevation angle measuring device on the gun. The camera is moved to keep the target airplane 500 in its line-of-sight, the light 502 on the plane forming an image on the sensitive surface 310 of the TV camera. In general, the image on the television frame will be spaced from the center axis, or the boresight, of the camera, and the position is located in the frame to give an accurate measure of the image location with respect to the boresight. The television frame under American standards is scanned 525 lines per frame 30 times a second to produce a picture signal but other scanning patterns may be used. The position of the image of the light in the frame can be measured by registering the line which intersects the image and the length of the line from the start of the line to the position of the image.

The size of the image of the signal light on the image surface of the TV tube should be at least as large as the width of two or three lines (or on the order of 3/1,000 of an inch for a TV camera tube with a ½ × ⅜ inch active area. With a small light that is necessary on the target, a sharply focused image may produce almost a true point which is not large enough to insure registering on the image surface with the scanning trace. The spot of the light may be made larger by displacing the image surface to either side of the in-focus plane of the lens, i.e., by displacing from the in-focus point of the lens, to increase the point image on the image surface to spot sufficiently large for registering by the scanning trace.

Figure 11:
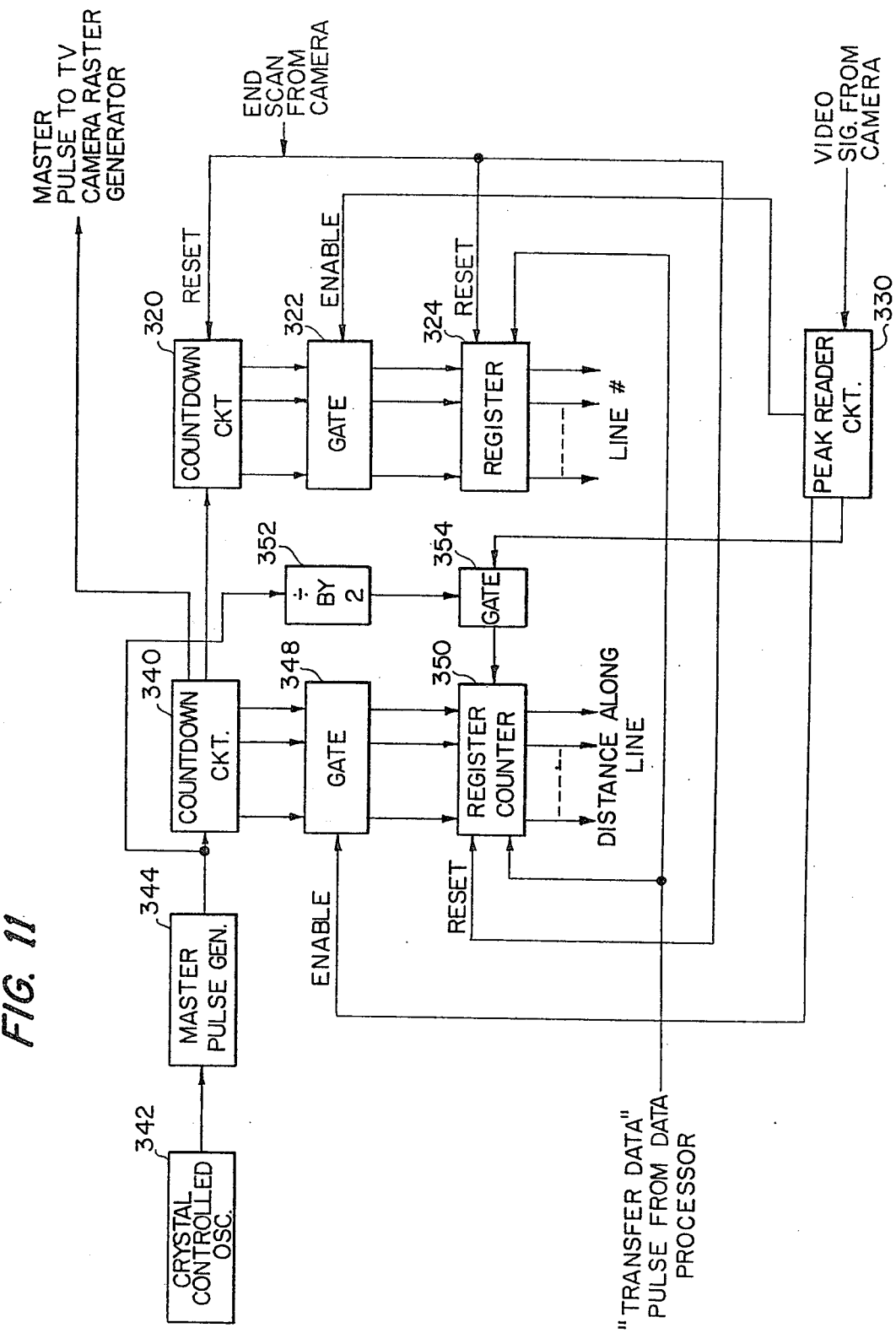
FIG. 11 shows the electronic circuit which provides the values of the coordinates of the image on the frame of the television camera.

Recognition of the light signal on the tube's sensitive surface is made on the basis of the highest level of the video signal during a scan of the electron beam. The circuit for recognizing this peak level and registering its position is shown in FIG. 11. For this purpose, the light must be intense enough to form an image of greater brightness than its background and, as described, large enough to be intersected by several lines. Infrared light has been found to be preferable as it is invisible to the gunner and penetrates moisture or haze better than light in other portions of the spectrum.

The start of the scan initiates the counter 320, which then counts the line traces until the end of the scan, when it is reset. The video signal has an input to a peak reader circuit 330 which, on receiving a peak video signal higher than preceding signals from the camera, enables gate 322 to pass the count from counter 320 to a register 324 which thereby registers the number of the line in which that peak occurred.

At the start of the scan, the peak reader will cause the first line number to be transferred as any video signal of a line trace signal will be greater than zero. A video signal of a higher level than that of the first line will then cause the transfer of the number of that line to register 324 replacing the previous number. No transfer signal occurs when the signal level of a line's video signal is not higher than the previous high level, so that at the end of the scan, the number of the line with the highest signal level, or greatest light intensity, is stored in register 324, to give one coordinate of the light image on the frame of the TV tube.

The other coordinate is obtained by measuring the point on the line that the peak signal occurred. This measure is made in a counter 340 by registering a series of pulses from the start of the line; the number of pulses, N, being determined by the resolution required.

In the example shown, a crystal controlled oscillator 342 and the pulse generator 344 operate at a frequency of 3.91625 MHZ to transmit $3.91625 \times 10^6$ PPS to the countdown circuit 340, which reduces the pulse rate by dividing by 256 to give $15.75 \times 10^3$ PPS which provides the master pulse to the TV camera raster generator. These pulses also supply the countdown circuit 320.

The gate 348 passes the count in counter 340 to the register 350 under control of a signal from the peak reader circuit in the same manner as for the line counter, so that the register contains the number of pulses from the beginning of a line, which indicate the position on the line that a peak level intensity occurs.

As the image of the light can be wider than the equivalency of 1 count distance along a line, the signal from the peak reader to the gate causes, first, the count in the countdown circuitry unit that exists at the beginning of the new high peak signal to be transferred to the register counter 350 via a gate 348, then increases the count in the register one count for each two counts inputted to the countdown circuitry unit through division circuit 352 and gate 354. After the passage of the "high", the register 350 will have a count which is related to the center of the high signal, and higher accuracy results.

The operation of the gun at the proper time will cause the data processing unit to read out the registers 324 and 350 into the DPU, giving the counts corresponding to the coordinates of the peak level signal on the image surface of the television camera frame 310, under control of a transfer data pulse from the DPU. The DPU then calculates the true line-of-sight of the light beacon on the target.

Following the scan of each frame 310 of the television camera, an end scan signal from the camera resets the counter 320 and registers 324 and 350 for the next scan.

RANGE MEASUREMENT SYSTEM

The range measurement system used is of general application for measuring the distance between two points. The basis for measurement is the phase displacement of a long wave radiation signal which has a length as great as the distance to be traversed from one point to the other and return, so that the ambiguity of a phase displacement of more than 360° is avoided. By this invention, the same result is obtained by transmitting two continuous wave radiations $f_1$ and $f_2$, differing by the low frequency $f_R$ ($f_R=f_2-f_1$) and subsequently measuring the phase displacement of the low frequency $f_R$ at the receiver. The two transmission frequencies may be produced by adding the low frequency $f_R$ to a higher frequency $f_A$, the two frequencies $f_A$ and $f_A+f_R$ then being combined with a high frequency $f_C$. The two frequencies $f_1$ and $f_2$ ($f_1=f_A+f_C$ and $f_2=f_A+f_C+f_R=f_1+f_R$) may then be transmitted as two continuous wave radiations.

Figure 12B:
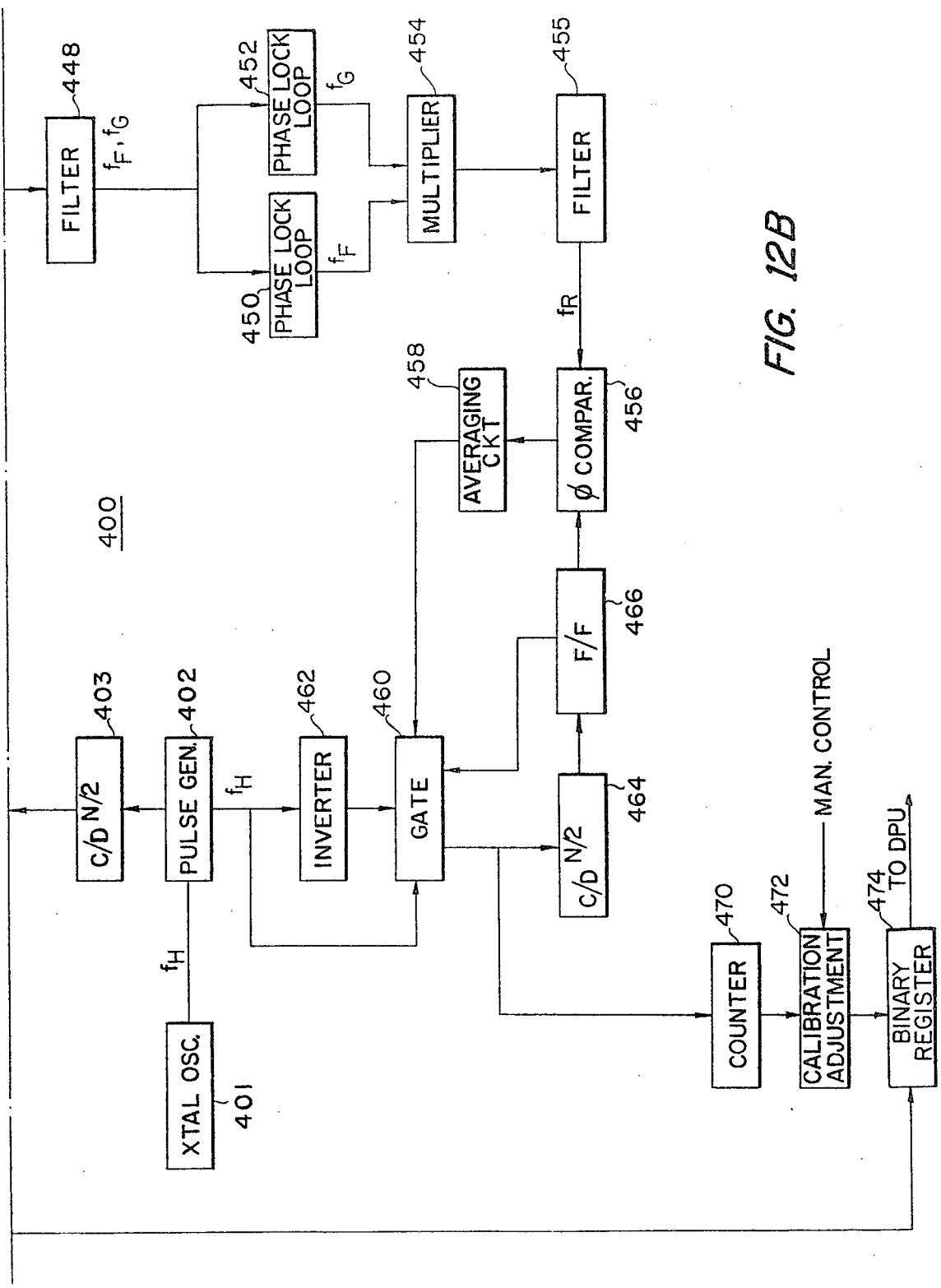

The transmitting apparatus A shown in FIG. 12 utilizes a crystal oscillator 401 with output $f_H$ ($f_H=Nf_R$) connected to a pulse generator 402 to produce pulses at $f_H$ rate. These pulses then go to a countdown circuit 403 with output of pulses $f_H/(N/2)$. These are fed to a flipflop circuit 404, producing square waves of $f_R$ frequency, which are formed into sine waves by filter 405 and input to converter 406. The output of crystal oscillator 407 frequency $f_A$ combines with $f_R$ in converter 406 ($f_B=f_A+f_R$) and is filtered at 408, which passes only frequency $f_B$.

A crystal oscillator 410 with output $f_C$ connects to converter 412, which also receives inputs $f_A$ from oscillator 407 and $f_B$ from filter 408 to produce the transmitting frequencies $f_1$ and $f_2$ ($f_1=f_C+f_A$) ($f_2=f_C+f_A+f_R$). The band pass filter 414 passes the high frequency band only slightly wider than $f_R$, i.e., $f_1$ and $f_2$, which are amplified by amplifier 416 and power amplifier 418, to be radiated by antenna 420.

The transmitted high frequency radiations $f_1$, $f_2$ are received by the transponder 422, consisting of a receiver and transmitter, at a distant point, in this case on the target 500. These signals are amplified in amplifier 424, combined in converter 425 with output $f_D$ of crystal controlled oscillator 426 and passed through filter 428 to amplifier 430. After amplification in linear amplifier 432, the high frequency signals $f_3$, $f_4$ ($f_3=f_1+f_D$, $f_4=f_2+f_D$) are transmitted by antenna 434 as continuous wave radiations differing by low frequency $f_R$.

The radiations $f_3$, $f_4$ from the transponder are received by antenna 440 of the receiver B, in this case associated with transmitter A, and after amplification in amplifier 442, combine with output $f_E$ of crystal controlled oscillator 444 in converter 446 and pass through filter 448 as frequencies $f_F$ and $f_G$, differing by frequency $f_R$. The phase-lock loop circuits 450, 452 each respond to one of the frequencies $f_F$ and $f_G$, which are then combined in multiplier circuit 454 to form the difference frequency $f_R$, the filter 455 passing only $f_R$.

This $f_R$, the difference frequency of the transmissions from the first point to the second point and return, has been displaced in phase in proportion to this distance. This $f_R$ is now compared with the difference frequency $f_R$ from $f_1$, $f_2$ in the transmitters in the phase comparison circuit 456.

These latter $f_R$ pulses are derived from pulses produced by the pulse generator 402, at the $f_H$ rate, which pass to gate 460 directly, and also to the gate through inverter 462. This gate may pass the pulses at $f_H$ rate to the countdown circuit 464, where the output from the gate is divided by N/2 to give pulses to the flipflop circuit 466 which has a square wave output at the $f_R$ rate and fed to phase comparison circuit 456.

The square wave from the flipflop 466 at the $f_R$ rate, derived from the source frequency, is input to the phase comparison circuit 456 with the sine wave signal $f_R$ which is the "round trip" signal from the distant point. The output of the phase comparison circuit 456 and its averaging circuit 458 varies in amplitude and polarity according to the phase difference between the two signals, and is positive or negative when the phase of one signal is ahead or behind the phase of the other. This voltage is fed to the gate circuit 460, which receives positive pulses at the $f_H$ rate directly from pulse generator 402 and also from the inverter 462, the negative pulses from the pulse generator producing the positive pulses from the inverter intermediate in time with respect to the direct pulses.

With no voltage applied to the gate 460 from the phase comparison and averaging circuits, the gate passes positive pulses at the $f_H$ rate to the countdown circuit 464. A no-voltage condition for the phase comparison circuit occurs when no phase difference exists between the input signals.

A positive voltage from the phase comparison circuit 456 to the gate circuit 460 will cause additional pulses to be supplied to the countdown circuit from the inverter 462, thereby advancing the square wave in time and therefore its phase. These additional pulses from gate 460 will cause the counter 470 to "step ahead". When the voltage from the phase comparison and averaging circuits is negative, the gate will stop or negate the pulses arriving at the gate directly from the pulse generator and the countdown action will be retarded as long as the negative voltage exists. The stability of the circuit is assured by inputting a signal from the flipflop 466 to the gate 460, so that only one pulse can be added or negated in one $f_R$ cycle.

In operation a difference in phase of the two signals results in an output of the phase comparison circuit which causes a shift in the square wave so as to achieve alignment of the phase of the square wave with that of the round trip signal. As the phase of the round trip signal received varies due to change in distance of a moving point, the circuit responds to follow the change.

To obtain the range data in digital form for the data processor, the pulses from the gate to the countdown circuit are also inputted to the binary counter 470 of N stages. This counter will therefore by cycled through a full count for each cycle of the range measurement frequency. The output of the binary counter then passes through calibration adjustment circuit component 472 to a binary register 474. The leading edge of the $f_R$ square wave at the output of flipflop unit 404 initiates the transfer of the contents of Binary Register 474, which at that moment will be a binary equivalent of the measured range, to the DPU.

The calibration adjustment component 472 provides for a calibrated range setting for the system. The setting is required since the phase of the range measuring frequency in its round trip is affected by the components of the system and the several circuits, including wiring and cables. Once the system is constructed and installed, these phase shifts are fixed.

The calibration adjustment component 472 may be set by comparing with a known distance of the aircraft on which the system is installed and the ground unit, then manually setting the calibration adjustment control to give a range data reading of the known distance. This setting may be made at the airport with the aircraft unit on the ground a measured distance from the ground unit. This procedure should be followed when any changes take place in the aircraft or in the installation of the unit.

For day-to-day operations, the ground unit may be checked using an aircraft unit at a known distance to ascertain if the system is providing correct data. As this unit may differ in its phase shift characteristics from the one installed on the aircraft, an initial measure of this difference must be obtained by comparing the setting for the test unit and for the aircraft installation.

This range measurement system is unusually stable, since it is less subject to external conditions than many other types of systems. A major influence on circuit phase constancy is the temperature of circuit elements as, for example, capacitors which may change in value with temperature, and consequently the characteristics of a circuit and its phase effect. The present system obviates or reduces temperature effects sufficiently that ordinary circuit design and construction techniques may be employed. This effect is the result of using two closely spaced signals, as $f_1$ and $f_2$, or $f_3$ and $f_4$, which pass through the same circuit elements and circuits. External conditions, such as temperature change, will affect both signals to substantially the same extent, so that the relative phase differences of the two signals will be substantially constant.

Operation of this system with the narrow band necessary in the very high frequency range results in economies of standard circuitry and low power. Interference in this range, as well as noise effects, are less of a problem, and allocations are more likely to be available. The problems and circuitry inherent in modulating the carrier frequencies are also avoided.

This distance measurement system will have a usable range comparable to the wavelength corresponding to the difference frequency $f_R$. For example, the difference or range measuring frequency of 7.5 KHZ gives an unambiguous measurement of range up to 18 kilometers. This range is satisfactory for the purposes of the Weapon Aim Evaluation System. The range measurement accuracy is a function of an incremental unit of the wavelength of frequency $f_R$, however, if a greater accuracy is required, a venier effect may be provided by the phase measurement of one of the high frequencies $f_1$ or $f_2$, with a correspondingly more sophisticated circuitry for producing a fine, unambiguous measurement at the higher frequency.

The two transmitted continuous wave radiations in this system are transmitted as two separate signals. The same effect could be produced by other means, for example, by two side bands of a single carrier, spaced by the difference frequency $f_R$ (7.5 KHZ in the example), and the carrier frequency could be eliminated at the transmitter.

I claim:
1. The method of measuring the angular position of an element movable about an axis relative to a supporting structure, comprising producing electrical pulses at substantially uniform intervals, rotating a member about said axis at uniform speed, transmitting a first beam of light from a fixed source to a photosensitive device through a fixed path interrupted by said rotating body, altering the amount of light entering said photosensitive device at one point in the rotation of said rotating body, transmitting a second beam of light from a source on said movable element through a variable path spaced at an angle from said first path according to the position of said element and interrupting said beam by said rotating body, altering the amount of light entering said photosensitive device at another point in the path of rotation which is spaced from said one point an angular distance equal to the angle of movement of the movable element, counting said electrical pulses, initiating the counting of the pulses by change in energization of said photosensitive device upon altering of the light at said one point, and discontinuing the counting of said pulses by altering the energization of said photosensitive device upon altering of the light at said another point, and registering the count of the pulses between the starting and stopping of said counting to provide a measure of the angular position of the movable element.

2. A system for measuring the angular position of an element movable about an axis relative to a supporting structure, comprising a rotating member driven at a substantially uniform speed about said axis, pulse mechanism cooperating with said rotating member to produce a plurality of electrical pulses every revolution of said rotating member at substantially uniform intervals, said disk having an aperture therein spaced from said axis, a light source mounted in fixed position on said supporting structure and directed to said disk in the path of said aperture, a second light source mounted on said movable element for angular movement about said axis and directed to said disk in the path of said aperture at an angle to said fixed light dependent on the angular position of said element, a light directing system rotatable with said disk to direct light passing through said aperture along said axis, a photosensitive element positioned in the path of said light directed along said axis, a counting circuit connected to said pulse mechanism to count said pulses emitted by said mechanism, a start system to initiate counting of said pulses upon energizing of said photosensitive device by said fixed light, and a stop system to discontinue counting of said pulses by energization of said photosensitive device by said movable light, said counting device registering the number of pulses between said start and stop of the counting to provide a measure of the angle of movement of said element.

3. A system according to claim 2, in which said movable element is a missile-firing weapon movable about a horizontal axis, said rotating member is a disk which is formed to intercept a light beam to a photosensitive device at regular intervals during rotation to produce said electrical pulses.

4. The method of registering the position of an angularly movable element movable about orthogonal axes comprising counting series of pulses representing the instantaneous angular position of said element upon movement about one of said axes, counting series of pulses representing the instantaneous, angular position of said element relative to a line between a remote fixed point and a point fixed on said element and spaced from said other axis, counting pulses to measure the angle between said line and a fixed base line, and calculating from said last two measurements the angle of said element relative to said fixed base line.

5. In a system for registering the angular position of an angularly movable element movable about an axis comprising a first unit carried by said element spaced from said axis and a second unit at a fixed point spaced from said element, said first unit comprising a counting pulse mechanism for producing a series of continuous, uniform pulses, means to initiate counting of said pulses, a detector on said second unit at said fixed point actuated by signals from said first unit to stop counting of said pulses to measure the angle of said element relative to the line between said first unit and said fixed point, a counting pulse mechanism at said fixed point and including signaling means which initiates counting of pulses, and means on said first unit receiving signals from said fixed point to stop counting of said last pulses to measure the angle of said line to a fixed base line, and a counting circuit for receiving said pulses and calculating the angle of said element relative to said fixed base line.

6. The method of measuring the angular position of an element movable about an axis relative to a fixed base line in a plane perpendicular to said axis, in which electrical counting pulses are registered in a counting circuit, comprising rotating a first reflecting device carried by said angularly movable element about an axis parallel to and spaced from said first axis, actuating a start pulse at one point in the rotation of said reflecting device to start counting said pulses, reflecting radiation from a radiation source at a fixed point spaced from said element by said rotating reflecting device to a fixed detector to actuate a stop pulse to stop counting said pulses to give a measurement of the angular position of said angularly movable element relative to a line from said rotating reflecting device to said fixed point, rotating a second reflecting device at said fixed point, reflecting radiation from a fixed radiation source by said second reflecting device to a second detector to actuate a start pulse to start counting pulses, reflecting radiation from a fixed radiation source by said second reflecting device to a detector on said angularly movable element to actuate a stop pulse to stop counting pulses, registering said counts of pulses to the angular position of said element relative to said line from the element to the fixed point and the angle of said line to the fixed base line, so as to determine the angular position of said element relative to said fixed base line.

7. A system for measuring the angular position of an element angularly movable about an axis relative to a fixed base line in a plane perpendicular to said axis, comprising a rotating body carried by said element spaced from said axis, a first single electrical start pulse producing means operable by said body at one point in each revolution, a reflecting device rotatable synchronously with said body, a radiation source at a fixed point spaced from said angularly movable element and a detector to receive radiation from said source reflected by said reflecting device to produce a first electrical stop pulse, a second rotating reflecting device at said fixed point, a second radiation source and a second detector at fixed positions, said second detector receiving radiation reflected by said second reflecting device from said second source to said second detector to produce a second start pulse, a third detector element carried by said angularly movable element to receive radiation reflected by said second reflecting device from said second radiation source to produce a second stop pulse, said system including electrical counting pulse mechanism to produce successive counting pulses, said first start pulse and first stop pulse starting and stopping counting pulses representing the angle of said angularly movable element relative to the line to said fixed point and said second start pulse and said second stop pulse, starting and stopping pulses representing the angle between said fixed base line and said line from said rotating body to said fixed point, and circuit means receiving said counting pulses to register said angles, said circuit also registering the angle of said angularly movable member to said fixed base line from the values of said two angles.

8. In a system for registering the angular position of an angularly movable element movable about orthogonal axes, comprising a pulse counting mechanism, and means rotatable about one of said axes to actuate a start pulse to initiate counting of the pulses including means variable by movement of said element about said one of said axes to actuate a stop pulse controlled by the position of the element relative to one of said axes to measure the position of the element by the count of said pulses, a first unit movable with said element about the other of said axes but spaced from said axis and including a rotating reflecting device, a counting pulse mechanism in said unit with means synchronized with said rotating reflecting device to actuate a starting pulse to initiate counting of the pulses, a second unit at a fixed point spaced from said angularly movable element and having means transmitting a signal to said rotating reflecting device and a detector receiving the reflected signal to actuate a stop pulse to stop said counting to measure the angular position of said angularly movable element relative to a line through said movable unit and said fixed point, a counting pulse mechanism in said second unit at said fixed point, said second unit including rotating means to actuate a starting pulse and a second rotating reflecting device, a signal device and a detector at said second unit to receive a signal reflected by said second reflecting device to actuate a starting pulse, said first unit having a detector to receive a signal reflected by said second reflecting device to actuate a stop pulse to stop counting of said pulses and measure the angle of said line relative to a fixed base line, and calculating means receiving said pulses from said first unit and from said second unit to compute the angular position of said angularly movable element relative to said fixed base line.

\* \* \* \* \*